United States Patent [19]
Kobayashi

[11] Patent Number: 5,090,241
[45] Date of Patent: Feb. 25, 1992

[54] FLOW RATE SENSOR

[75] Inventor: Hiroshi Kobayashi, Yokohama, Japan

[73] Assignee: Nissan Motor Company, Limited, Japan

[21] Appl. No.: 543,868

[22] Filed: Jun. 26, 1990

[30] Foreign Application Priority Data

Jun. 28, 1989 [JP] Japan .................................. 1-166417

[51] Int. Cl.$^5$ .............................................. G01F 1/68
[52] U.S. Cl. .................................................. 73/204.26
[58] Field of Search ........... 73/204.15, 204.16, 204.25, 73/204.26, 204.27; 338/294, 302; 219/505; 392/373, 374, 379

[56] References Cited
U.S. PATENT DOCUMENTS 4,311,042 1/1982 Hosoya et al. .
4,445,369 5/1984 Stoltman et al. ............ 73/204.26 X
4,463,601 8/1984 Rask .................................. 73/202 X
4,505,248 3/1985 Yuzawa et al. .
4,691,566 9/1987 Aine .
4,776,214 10/1988 Moran et al. .

Primary Examiner—Herbert Goldstein
Attorney, Agent, or Firm—Lowe, Price, LeBlanc & Becker

[57] ABSTRACT

A flow rate sensor is provided. This sensor includes flow rate detecting elements and a plurality of separate circular support members. The circular support members are arranged concentrically within a passage each having a different diameter and support the flow rate detecting elements respectively so as to cover the entire stream area of a diameter section of the passage. Thus, the flow rate sensor may precisely detect the flow rate of a fluid flowing within the passage regardless of instability in the flow distribution of the fluid.

14 Claims, 8 Drawing Sheets

FLOW RATE SENSOR

BACKGROUND OF THE INVENTION

1. Technical Field

The present invention relates generally to a flow rate sensor, and more particularly to a flow rate sensor which is suitable for determining the flow rate of intake air into an internal combustion engine, for example.

2. Background Art

A hot-wire air flow meter as a flow rate sensor is well known in the art. This meter is used for measuring the flow rate of intake air into an internal combustion engine. The meter generally includes a small winding type hot-wire probe which has a relatively great mechanical strength and an air temperature probe for detecting the temperature of intake air. These probes are disposed within a bypass air passage. It will be appreciated that a hot-wire air flow meter may provide a high degree of mechanical strength against the common usage conditions of automotive vehicles such as vibrations, thermal shock, and backfire. Miniaturization, ease of mass production, and rapid response time are also attributes of this type of sensor.

However, in such a hot-wire air flow meter, the hot-wire probe as a flow rate detecting element is arranged within a bypass air passage independent of the main air passage. Therefore, flow rate measurement is subject to inaccuracy due to pulsations caused by the opening and closing of the intake valves of the engine which causes flow velocity and distribution to vary continually, creating an extremely insecure condition with asymmetrical distribution therein due to the many curved sections and necessary straight sections within an air passage. Due to spatial restrictions a hot wire type flow rate sensor cannot take such conditions into account.

In view of the above drawbacks, a uniquely designed flow rate sensor provided with honeycomb shaped flow rate detecting elements has been developed. This sensor is disclosed in U.S. patent application No. 352,317 field on May 15, 1989, entitled "FLOW RATE SENSOR" by Hiroshi KOBAYASHI, and assigned to NISSAN MOTOR CO., LTD.

This type of the flow rate sensor includes a plurality of cells defined by the flow rate detecting elements which are made of metallic foil and a circular support member which covers the detecting elements to retain it in a flow passage. A fluid flowing within the flow passage passes through the cells without pressure drop.

However, the mechanical strength of this flow rate sensor is insufficient to be used in extremely insecure environments such as an intake manifold to which vibrations are transmitted from an engine. Further, to form the honeycomb structure of the above-cited sensor, complex processes are necessary wherein an insulating layer and an electrical resistance layer are laminated on a metallic foil by a spattering method, increasing its manufacturing cost.

SUMMARY OF THE INVENTION

It is accordingly one object of the present invention to avoid the disadvantages of the prior art.

It is another object of the invention to provide a flow rate sensor which has an improved mechanical strength and is formed easily.

According to one aspect of the present invention, there is provided an apparatus for determining the flow rate of a fluid within a passage which comprises a first means for radiating heat energy to the fluid flowing within the passage, a plurality of cylindrical support members having different diameters and arranged concentrically within the passage, the support members supporting the first means at a plurality of areas transversely offset from each other with respect to the flow direction, a second means for determining the heat quantity transferred from the first means to the fluid to provide a signal indicative thereof, and a third means for determining the flow rate of the fluid flowing within the passage based on the signal output from the second means.

According to another aspect of the invention, there is provided an apparatus for measuring the flow rate of a fluid within a passage which comprises a flow rate element for radiating heat energy to fluid flowing within the passage, the flow rate element including a hollow cylindrical member and electrical resistance film attached to a preselected downstream area of the cylindrical member, a support means including a cylindrical member which is axially arranged in the flow direction for supporting the flow rate element within the passage, a first means for determining the heat quantity transferred from the flow rate element to the fluid to provide a signal indicative thereof, and a second means for determining the flow rate of the fluid flowing within the passage based on the signal output from the first means.

According to a further aspect of the invention, there is provided an apparatus for measuring the flow rate of a fluid within a passage which comprises a temperature sensor for detecting a temperature of the fluid flowing within the passage to provide a signal indicative thereof, a plurality of flow rate detecting elements each including electrical resistance film for radiating heat energy to the fluid flowing within the passage, a plurality of separate cylindrical support members having different diameters and arranged concentrically within the passage, said support members supporting said flow rate detecting elements to uniformly cover the entire stream area of a diameter section of the passage so as to maintain a difference in temperature, between the fluid detected by said temperature sensor and the heat energy radiated by the resistance film, at a constant level, a first means for determining the heat quantity transferred from said flow rate detecting elements to the fluid to provide a signal indicative thereof, and a second means for determining the flow rate of the fluid flowing within the passage based on the signal output from said first means.

DESCRIPTION OF THE PREFERRED EMBODIMENT

Figure 1:
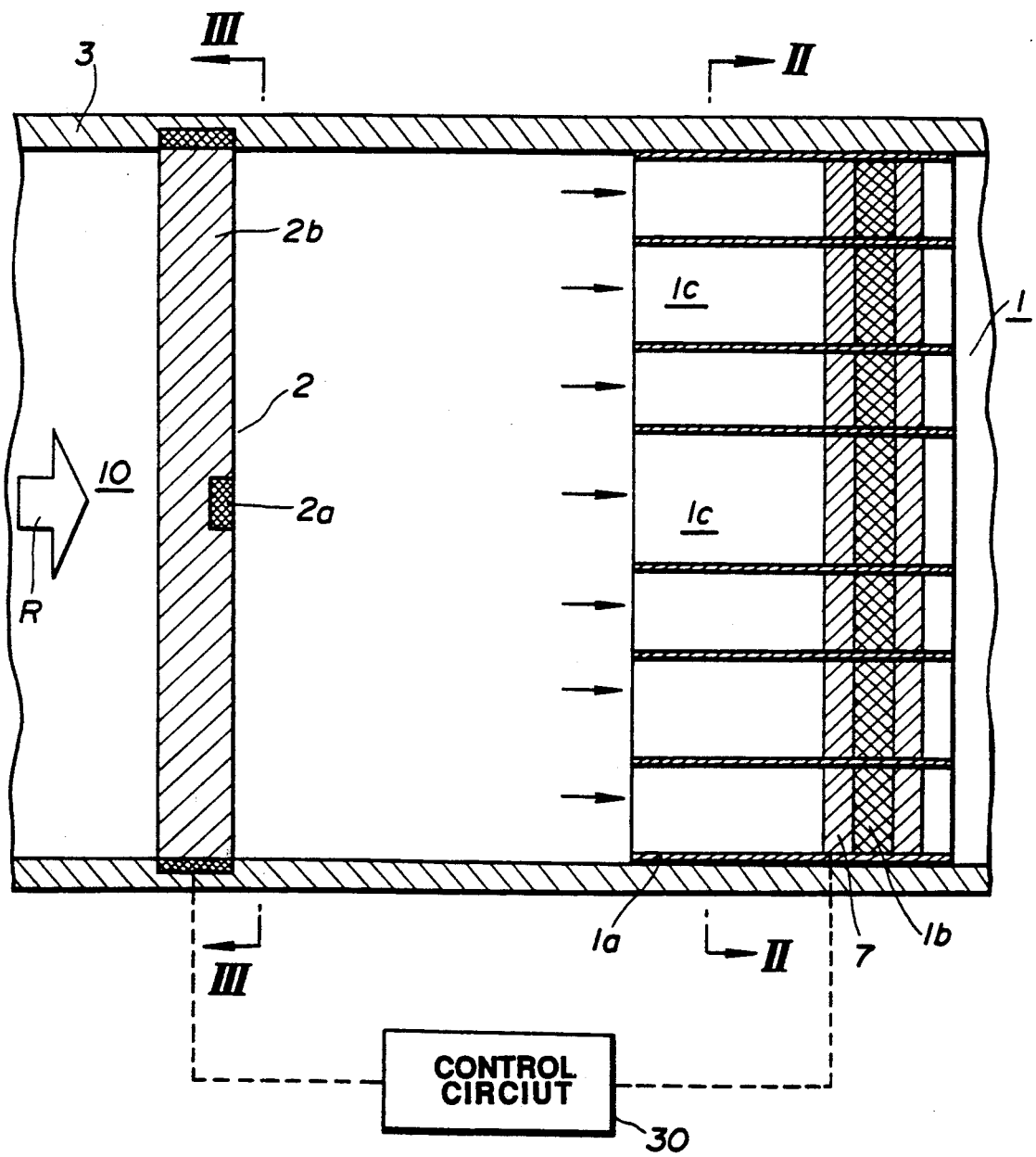
FIG. 1 is a sectional view which shows an arrangement of a flow rate sensor according to the present invention and a temperature sensor within a flow passageway.

Referring now to the drawings, particularly to FIG. 1, there is illustrated an arrangement of a flow rate sensor 1 according to the present invention which is installed on an inner wall of a duct 3 so as to cover the entire stream area of a diameter section of a flow passage 10 and a temperature sensor 2 which are mounted perpendicularly to the flow direction R. The temperature sensor 2 is adapted for measuring the temperature of fluid within the flow passage 10 to provide a signal indicative thereof to a control circuit 30. Such a flow rate sensor is available as an air flow meter for an internal combustion engine for example.

Figure 2:
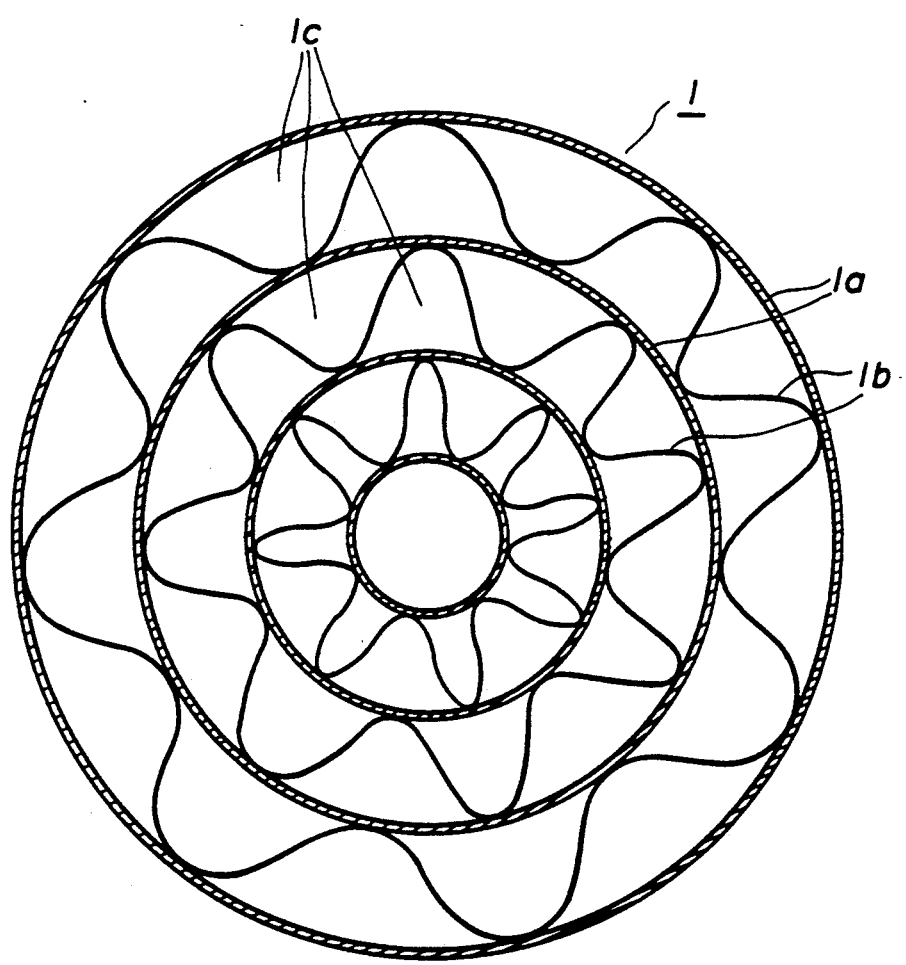
FIG. 2 is a front view taken along the line II in FIG. 1 which shows a flow rate sensor.

Referring to FIG. 2, the flow rate sensor 1 is shown. This sensor 1 includes four separate cylindrical support members 1a arranged concentrically and corrugated (flow rate detecting) elements 1b. The support member 1a is made of a plastic material or a metallic material such as aluminum. The corrugated elements 1b are disposed between the concentric support members 1a to define a plurality of cells 1c having openings respectively, through which the fluid may pass without pressure drop.

Figure 3:
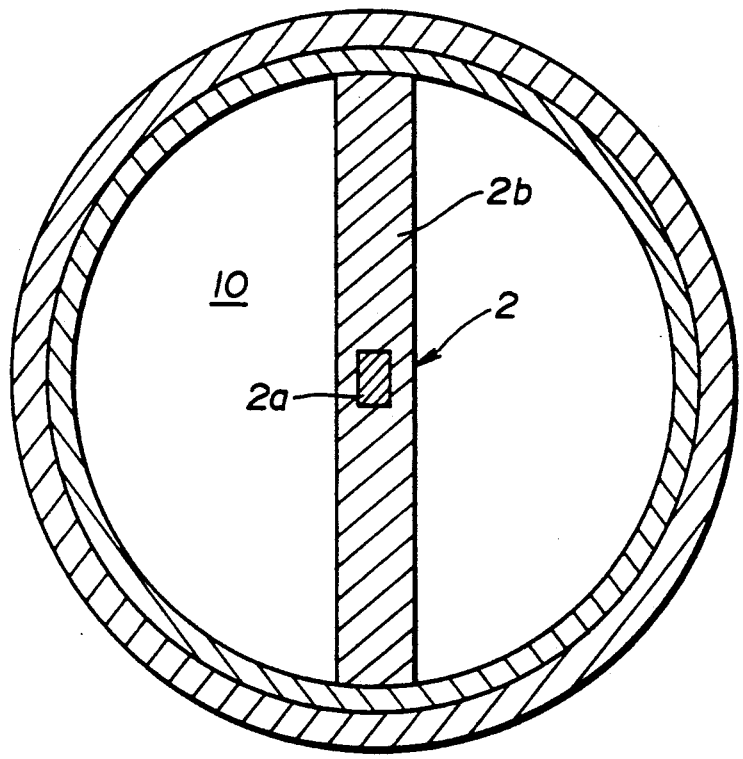
FIG. 3 is a front view taken along the line III in FIG. 1 which shows a temperature sensor.

Referring to FIG. 3, the temperature sensor 2 is shown. This temperature sensor 2 includes thermistor element 2a and a bar member 2b made of a ceramic material such as an alumina. The thermistor element is attached to the center of the bar member. For forming the termistor element 2a, a ceramic material, dispersed by organic solvent, is applied on a preselected area of the bar 2 and then dried and baked.

Figure 4A:
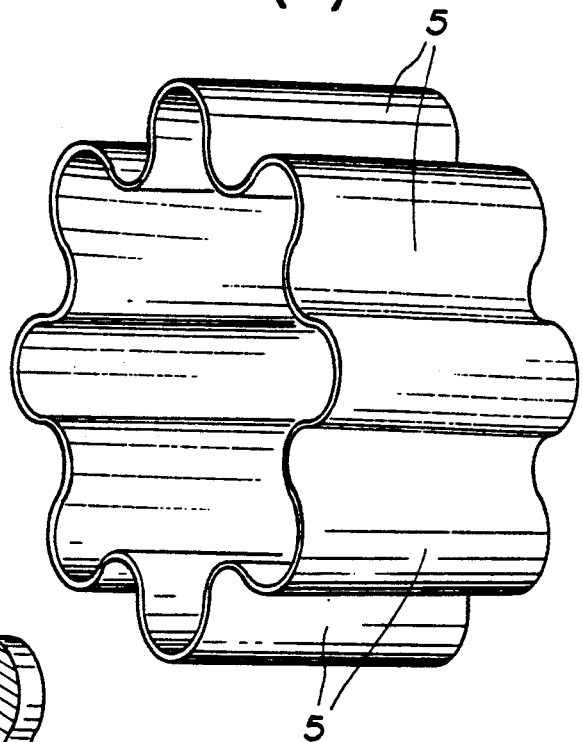
FIGS. 4(a) to 4(c) are side views which show a forming sequence for a flow rate detecting element of a flow rate sensor.
Figure 4B:
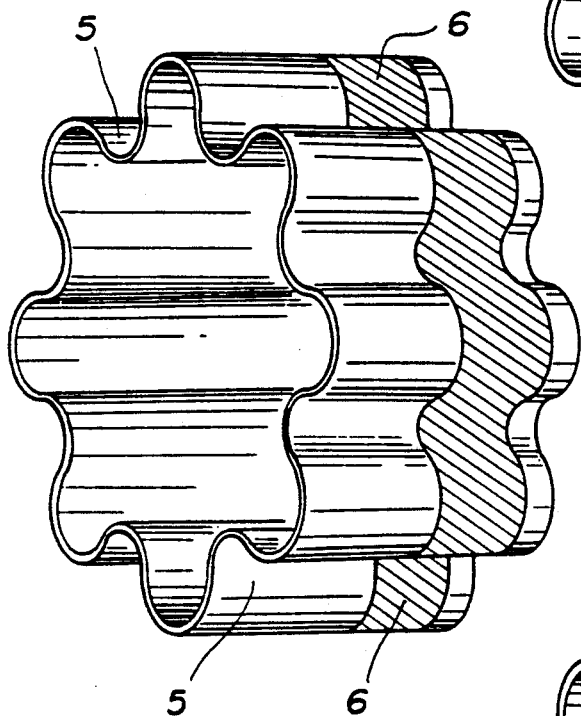
Figure 4C:
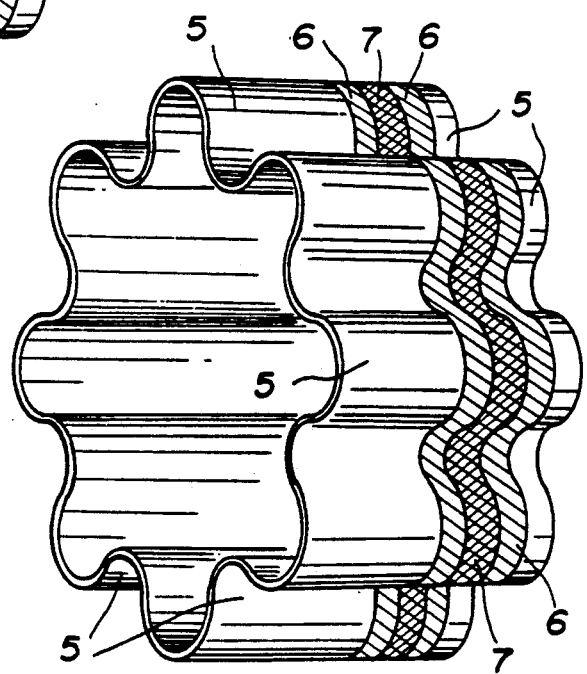

Referring to FIGS. 4(a) to 4(c), a process for producing the flow rate sensor is shown.

First, the corrugated member 5, as shown in FIG. 4 (a), is prepared of a cylindrical member which is made of a spring material such as a phosphor bronze plate having a thickness of 0.3 to 0.5 mm.

Fine grains made of ceramic materials such as aluminas and a glass material are mixed by organic solvent to provide a paste. The paste is then applied on preselected areas of the corrugated member 5 by means of screen printing to form a film having a thickness of 10 μm to 20 μm. Substantially, this corrugated member 5 with the applied paste is dried and baked with a preselected relation between time and temperature to form an insulating film 6 as shown in FIG. 4 (b).

Metallic grains made of platinum for example and glass materials are mixed by organic solvent to provide a paste. Similar to the above, the paste is applied to preselected areas on the insulating film 6 by screen printing with a thickness of about 10 μm.

After application, the paste layer is dried and baked with a preselected relation between time and temperature to provide a thin metallic film 7 (i.e., an electric resistance film) having a thickness of 0.2 μm to 0.5 μm as shown in FIG. 4(c).

The insulating film 6 and resistance film 7 are preferably formed on a downstream area of the corrugated member 5 when it is placed in the flow passage so that after the fluid is straightened by the upstream areas of the corrugated members, it passes over the resistance film.

The corrugated member 5 provided in the above manner is, as shown in FIG. 2, arranged in a circular space defined between the concentric support members 1a.

The corrugated members 5 are electrically connected to each other by an electrode made of metallic foil (not shown) through the thin film 7 and is further connected to the control circuit 30.

The principle of operation of the flow rate sensor according to the invention will be described hereinbelow. An electric resistance Rw provided by the thin metallic film 7 of the flow rate detecting element 5 constituting the flow rate sensor 1 is expressed as follows:

$$Rw = Rw_o(1 + \alpha Tw) \qquad (1)$$

Where Tw is a temperature of the metallic film 7. $Rw_o$ is a resistance value of the metallic film 7 at a reference temperature, for example, at 0 degrees. The $\alpha$ is a temperature coefficient of the metallic film 7.

When the application of a current i is provided to the metallic film 7, heat generated thereby, or a heat quantity Q is transferred to the fluid at v flow velocity. The heat quantity Q is determined by the following equation;

$$Q = i^2 Rw = (C_1 + C_2(\sigma v)^{\frac{1}{2}})$$

$$\times (Tw - Ta) S$$

Thus, $$i^2 = (C_1 + C_2(\sigma v)^{\frac{1}{2}})$$

$$\times (Tw - Ta) S / Rw \qquad (2)$$

Where $\sigma$ is the density of the fluid flowing through the flow passage. S is the surface area of the metallic film 7. Ta is the temperature of the fluid. $C_1$ and $C_2$ are constants.

Thus, as is clear from the above equation (2), by electrically controlling the value of $$(Tw - Ta) S / Rw \qquad (3)$$

regardless of the temperature Ta of the fluid, the current i may be expressed as a product of the density of the fluid and the flow velocity, or a function dependent only upon mass flow rate. The current i may be found to obtain the mass flow rate.

As is well known in the art, various control means which use a signal from a sensor for detecting a temperature Ta of the fluid may be provided for maintaining the value of the formula (3) at a constant value. In this embodiment, the control circuit 30 controls a current to be applied to the flow rate sensor 1 based on a temperature signal output from the temperature sensor 2 so as to maintain the value of the equation (3) at a constant value.

A U.S. Pat. No. 4,311,042 to Hoshiya et al. discloses a hot-wire air flow meter for an internal combustion engine. In a system of this invention, a hot-wire and a resistor are disposed within an intake passageway of an intake manifold. A control circuit is provided which will increase the voltage across the hot-wire to compensate for the energy dissipated by the hot-wire so that the temperature of the hot-wire is maintained at a constant value. With this provision, such a hot-wire flow meter may accurately measure the flow rate of the medium. A U.S. Pat. No. 4,505,248 to Yuzawa et al. discloses a hot-wire air flow meter control system for engines. The contents of these disclosures are hereby incorporated by reference.

The flow rate detecting element 1b, as shown in FIG. 1, is provided perpendicularly to the stream direction R of the fluid and covers the entire stream area of a diameter section of the passage. Further, the element 1b extends parallel to the flow direction R with a certain thickness.

Figure 5A:
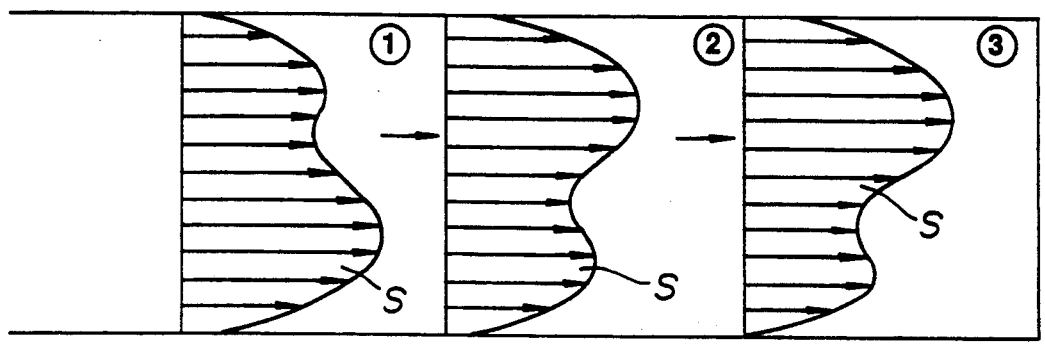
FIG. 5(a) is a graphic depiction of the flow velocity profile of intake air into an engine.

In a flow passage such as an intake manifold of an engine, fluid (air) tends to flow with an erratic flow profile with respect to space and time. In an engine, due to the restricted space within flow passages, provision of the necessary lengths of straight sections in the flow passages is difficult, therefore, engine flow passages include many curved sections. The intake stream of the engine is therefore subject to extremely erratic flow conditions. FIG. 5(a) illustrates the variations per hour in the velocity profiles of a fluid S at a cross section perpendicular to a stream direction within a flow passage. It will be appreciated that the stream of flow into the intake of the engine is spatially insecure.

Figure 5B:
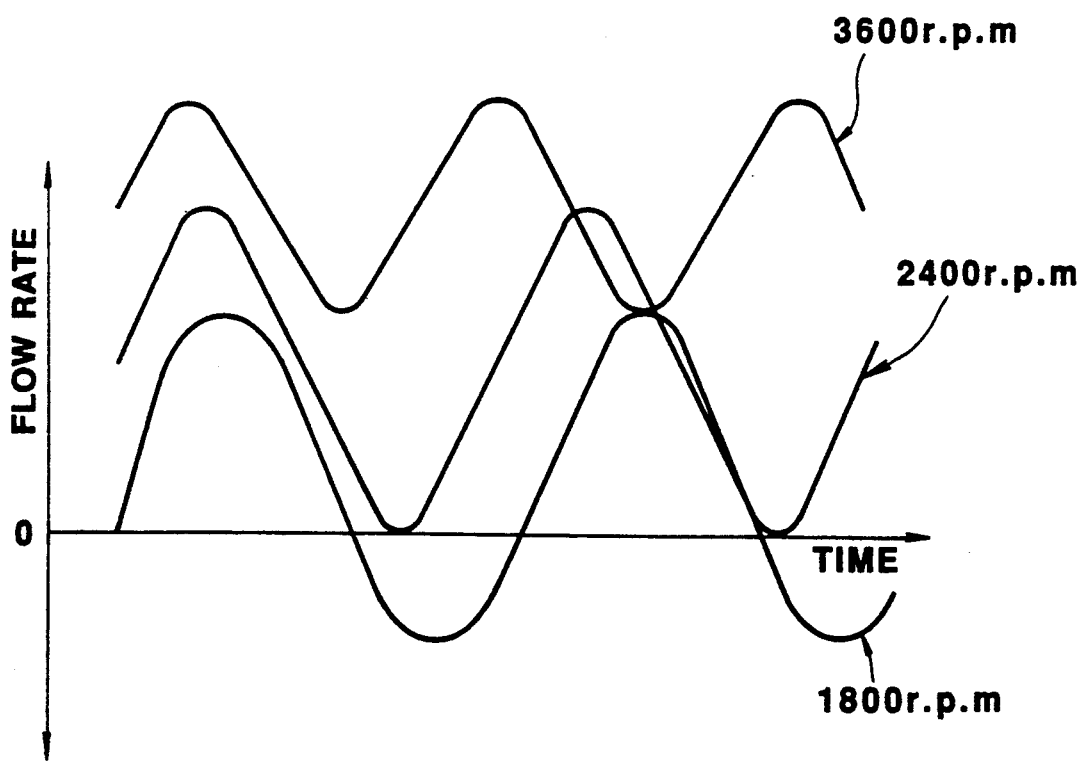
FIG. 5(b) is a graphic depiction of flow rate variations at various engine speeds.

Further, fluctuation, or pulsation flow which is synchronized with valve timing of an engine cylinder tends to occur in the stream of flow into the intake manifold of an engine. The more the difference in fluid pressure between the intake side of a flow passage, where a throttle valve is opened greatly, and the cylinder side, the greater the magnitude of pulsation flow. FIG. 5(b) illustrates pulsation flow in a fluid flowing into the intake when the throttle valve is opened greatly with respect to various engine speeds.

It will be noted that the stream of flow into the intake of the engine is always variable in relation to space and time and is extremely insecure. In order to always measure such an insecure stream precisely as a mean flow rate, the provision of a flow rate element which is disposed perpendicularly to the stream direction so as to cover all areas of a diameter of the flow passage is preferable. Accordingly, in this embodiment according to the invention, the corrugated metallic film elements are provided within a flow passage so as to be arranged perpendicularly to the flow direction of the fluid and so as to cover a diameter section of the flow passage. The metallic film element therefore encounters the fluid across the entire flowpath from the center of the passageway to the inner surface of the passage walls regardless of momentary variations in the flow stream. Thus, the flow rate detecting element according to the invention can determine the flow rate of a fluid passing through the flow passage precisely as a mean flow rate even when extreme flow variations occur.

The corrugated structure of the flow rate element takes the form of cells having openings, so that no pressure loss induced by the flow rate element tends to occur.

For installation of the flow rate element within the flow passage so as to cover all cross area thereof, a method for arranging a mesh of platinum or tungsten wires, or so forth may be proposed. However, with this method, the provision of a retaining means for the mesh within the passage while maintaining the mechanical strength of the wires is difficult. Additionally, the cost for provision of this retaining means is high. For these reasons, the above described retaining means is unsuitable for an automotive vehicle for example. However, the flow rate of the invention includes corrugated flow rate elements to provide a necessary mechanical strength easily.

Figure 6:
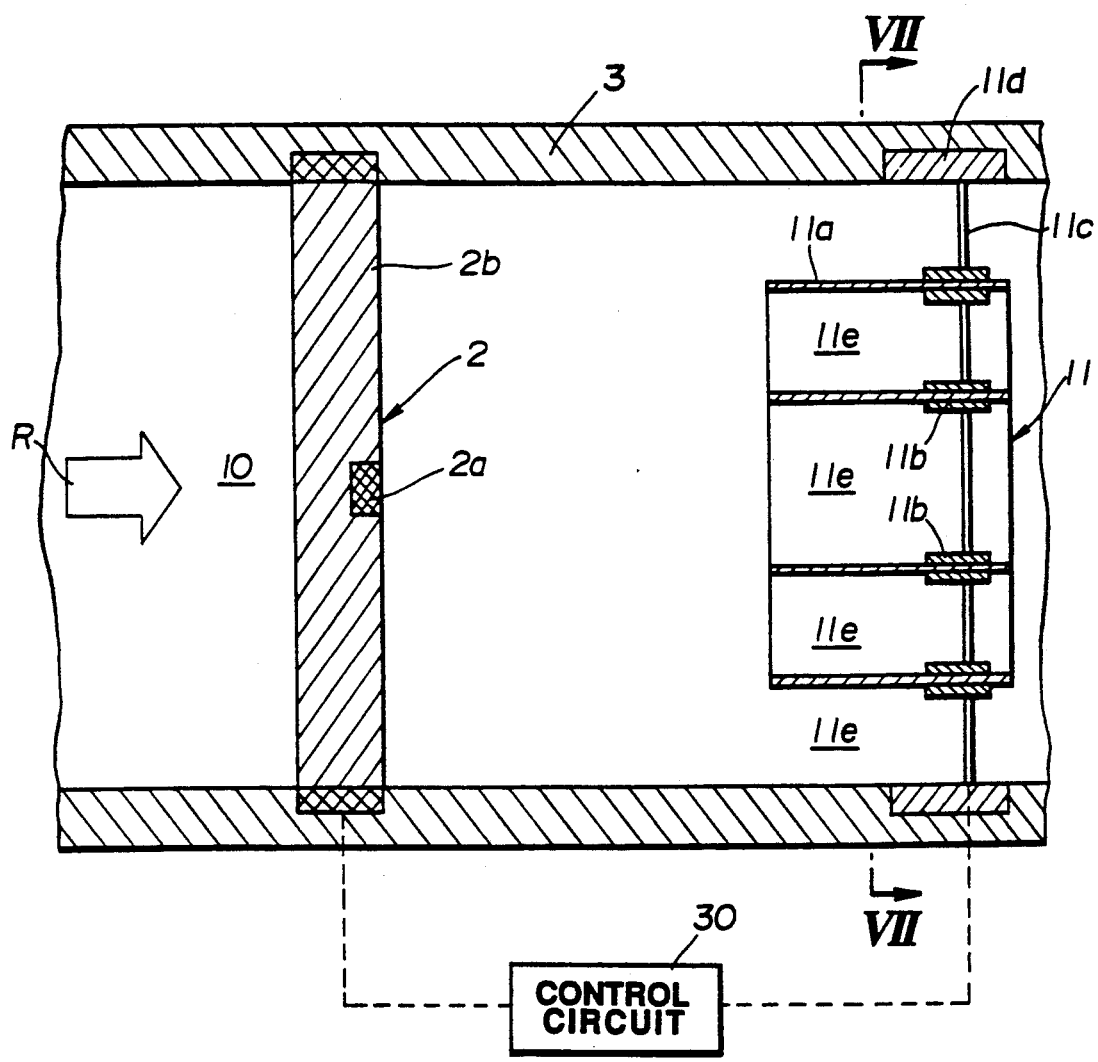
FIG. 6 is a sectional view which shows an arrangement of a second embodiment of a flow rate sensor according to the invention within a flow passageway.

Referring to FIG. 6, an alternative embodiment according to the invention is shown. A flow rate sensor 11 and a temperature sensor 2 are disposed perpendicularly to the flow direction R in a fluid passage 10 similar to the first embodiment.

Figure 7A:
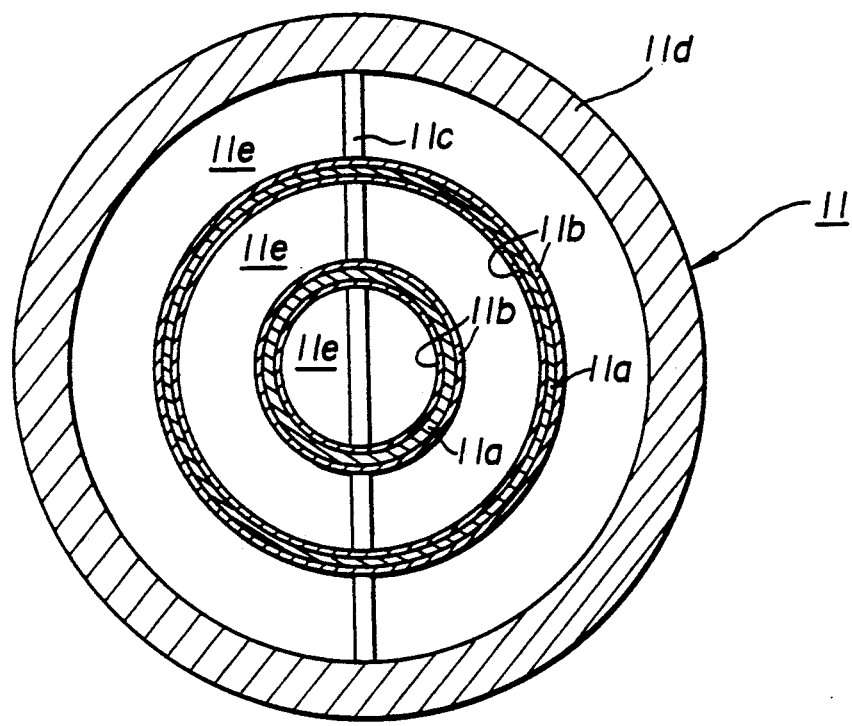
FIG. 7(a) is a front view taken along the line VII in FIG. 6 which shows a flow rate sensor of the second embodiment.

Referring to FIG. 7(a), the flow rate sensor 11 includes a plurality of metallic cylindrical members 11a arranged concentrically on which flow rate detecting elements 11b are disposed respectively. The flow rate sensor 11 is installed in a flow passage 10 so as to cover the entire stream area thereof to allow a fluid to pass through circular spaces 11e between the adjacent cylindrical members. The flow rate sensor 11 further includes a metallic connecting rod 11c which connects the cylindrical members 11a and a support member 11d. Both ends of the connecting rod 11c are fixed in the support member 11d respectively and the support member is then fitted in a recessed portion formed in an inner wall of a duct 3 to support the main portion of the flow rate sensor in the flow passage.

Figure 7B:
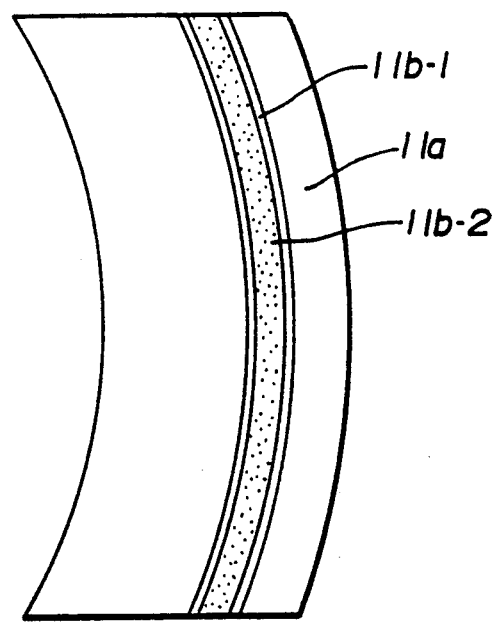
FIG. 7(b) is a partial sectional view which shows a flow detecting element disposed on a cylindrical member of a flow rate sensor.

Referring to FIG. 7(b), a partial section of the cylindrical member 11a is shown on which the flow rate element 11b includes an thin insulating film 11b-1 and a thin electrical resistance film 11b-2 which are formed thereon. The flow rate detecting element 11 is arranged on a rear side of the cylindrical member 11a or a downstream area thereof so that the fluid can be straightened somewhat by the upstream area of the cylindrical member as it passes through the flow rate detecting element.

Referring to FIGS. 8(a) to 8(d), a process for producing the flow rate sensor 11 is shown.

Figure 8A:
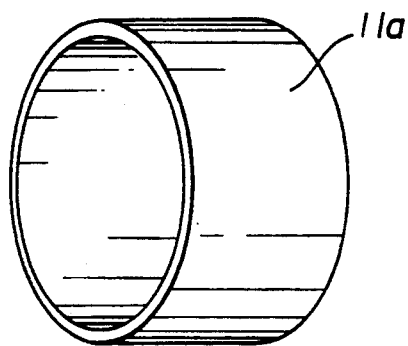
FIGS. 8(a) to 8(d) are perspective views which show a forming sequence for a flow rate detecting element of the second embodiment.
Figure 8B:
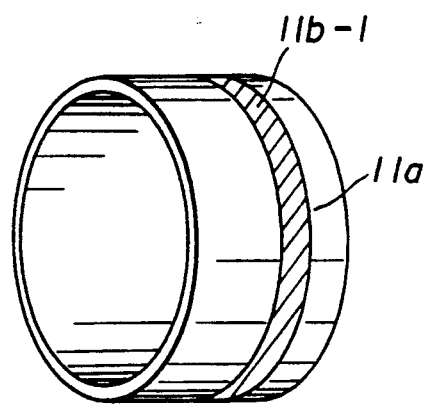

First, a thin tube or cylindrical member 11a is prepared which is made of aluminum or iron alloys as shown in FIG. 8(a).

An insulating layer 11b-1 which is made of an insulating material such as an alumina is formed on a surface of the cylindrical member 11a. For forming the insulating layer 11b-1, fine grains of alumina are dispersed via organic solvent to provide a paste. This paste is then applied on a preselected area of the cylindrical member by means of screen printing to form a film having a thickness of 10 μm to 20 μm. Substantially, the cylindrical member is dried and baked in a preselected relation between time and temperature to form the insulating layer 11b-1 as shown in FIG. 8 (b).

Figure 8C:
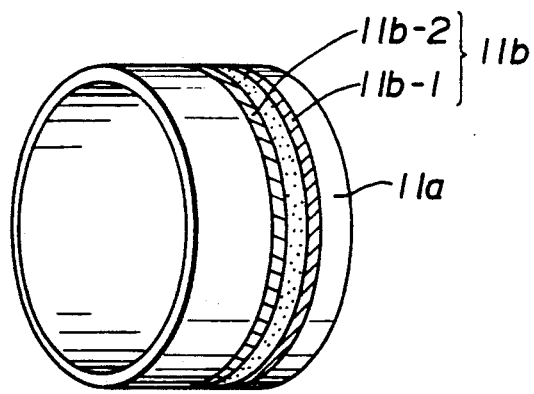

The resistance layer 11b-2 is formed on the insulating layer 11b-1 in the same manner as the above. The resistance layer 11b-2 is formed by a paste which is provided with fine grains made of platinum for example dispersed by a medium such as organic solvent. The paste is applied on the insulating layer 11b-1 by screen printing with a thickness of about 10 μm. By subsequently drying and baking the applied paste, a resistance layer 11b-2 is provided comprising a thin metallic film with a thickness of 0.2 μm to 1.0 μm as shown in FIG. 8(c).

Figure 8D:
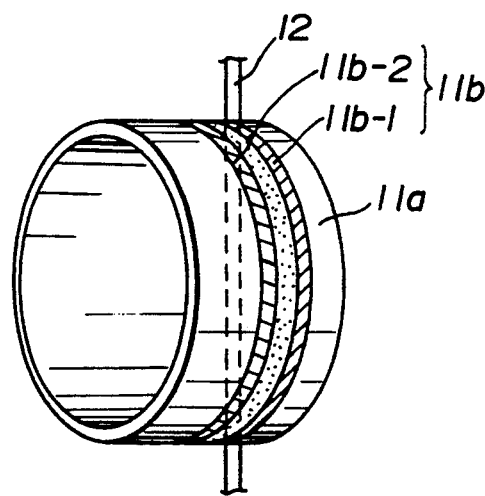

A metallic connecting rod 12 is inserted into holes (not shown) which are preprovided in the cylindrical members 11a. A conductive paste is applied on a contact area between the connecting rod 12 and the holes to electrically connect the metallic resistance layer 11b-2 and the connecting rod. Both ends of the connecting rod 12 are further connected to a control circuit 30 and inserted into a plastic support member 11d to be completed as shown in FIG. 8(d).

Operation of the flow rate sensor 11 is the same as that of the first embodiment. It will be appreciated that since the flow rate sensor includes a plurality of cylindrical members having the flow rate detecting elements which are arranged perpendicularly to the stream direction so as to cover the entire stream area of a diameter section of the flow passage, the sensor can detect the flow rate of the fluid in the flow passage precisely regardless of momentary flow variations. The flow rate detecting elements take the form of circles to provide openings between the adjacent elements which allow the fluid to flow therethrough without pressure drop. Additionally, the circular structure of the flow rate sensor has a necessary wall thickness to ensure mechanical strength sufficient to be supported in the flow passage.

Therefore, the flow rate sensor according to the invention, as mentioned previously, has the mechanical strength to provide a long life even if it is installed in an intake manifold to which vibrations of an engine are directly transmitted. The flow rate detecting element is formed of a thin film by wet forming and manufacturing costs can be reduced. Additionally, screen printing has the advantage of forming configurations of the insulating and resistance films precisely, reducing characteristic deviations.

What is claimed is:

1. An apparatus for determining the flow rate of a fluid within a passage, comprising:
   first means for radiating heat energy to the fluid flowing within the passage;
   a plurality of cylindrical support members having different diameters and arranged concentrically within the passage, said support members supporting said first means at a plurality of areas transversely offset from each other with respect to the flow direction;
   second means for determining the heat quantity transferred from said first means to the fluid to provide a signal indicative thereof; and
   third means for determining the flow rate of the fluid flowing within the passage based on the signal output from said second means,
   wherein said first means is a flow rate element including corrugated plate members and electrical resistance film attached thereon, the flow rate element being interposed between concentric cylindrical support members and arranged so as to cover the entire stream area of a diameter section of the passage.

2. An apparatus as set forth in claim 1, wherein said electrical resistance film is positioned on areas downstream from the center of the corrugated plate with respect to the flow direction.

3. An apparatus as set forth in claim 1, wherein said flow rate element with said support members defines a plurality of openings for allowing the fluid to flow therethrough without pressure loss.

4. An apparatus as set forth in claim 1, further comprising a temperature sensor for detecting a temperature (Ta) of the fluid flowing within the passage to provide a signal indicative thereof, said flow rate element have a surface area (S) and a resistance value (Rw), said second and third means constituting a control circuit for applying a current to said flow rate element to generate heat having a temperature (Tw), said control circuit controlling the current so as to maintain a value defined by the relation (Tw−Ta) X S / Rw at a constant level based on the signal output from the temperature sensor to determine the flow rate of the fluid based on the magnitude of the current applied to the flow rate element.

5. An apparatus for measuring the flow rate of a fluid within a passage, comprising: flow rate element radiating heat energy to fluid flowing within the passage, said flow rate element including a hollow cylindrical member and an electrical resistance film attached to a preselected downstream area of the cylindrical member;
   support means including a cylindrical member which is axially arranged in the flow direction for supporting said flow rate means within the passage;
   first means for determining an amount of heat transferred from said flow rate means to the fluid to provide a signal indicative thereof; and
   second means for determining the flow rate of the fluid flowing within the passage based on the signal output from said first means,
   wherein said flow rate element comprises first and second flow rate elements, said first and second flow rate elements having diameters different from one another, said hollow cylindrical member supporting said first and second flow rate elements on its inner and outer surfaces so as to be arranged concentrically with respect to the longitudinal center line of the passage.

6. An apparatus as set forth in claim 5, wherein said support means includes a tube and a bar member, said bar member being fixed to the tube which is attached to a passage wall and connecting said first and second flow rate elements.

7. An apparatus as set forth in claim 5, further comprising:
   a temperature sensor for detecting a first temperature (Ta) of the fluid flowing within the passage to provide a signal indicative thereof, said flow rate element having a surface area (S) and a resistance value (Rw), said first and second means constituting a control circuit for applying a current to said flow rate element to provide heat at a second temperature (Tw), said control circuit controlling the current so as to maintain a value defined by the relation (Tw−Ta) X S / Rw at a constant level based on the signal output from the temperature sensor to determine the flow rate of the fluid based on the magnitude of the current applied to the flow rate element.

8. An apparatus for measuring the flow rate of a fluid within a passage, comprising:
   a flow rate element for radiating heat energy to fluid flowing within the passage, said flow rate element including a hollow cylindrical member and electrical resistance film attached to a preselected downstream area of the cylindrical member;

support means including a cylindrical member which is axially arranged in the flow direction for supporting said flow rate element within the passage;

first means for determining the heat quantity transferred from said flow rate element to the fluid to provide a signal indicative thereof;

second means for determining the flow rate of the fluid flowing within the passage based on the signal output from said first means; and a temperature sensor for detecting a temperature (Ta) of the fluid flowing within the passage to provide a signal indicative thereof, said flow rate elements having a surface area (S) and a resistance value (Rw), said first and second means constituting a control circuit for applying a current to said flow rate elements to generate heat having a temperature (Tw), said control circuit controlling the current so as to maintain a value defined by the relation (Tw−Ta) X S / Rw at a constant level based on the signal output from the temperature sensor to determine the flow rate of the fluid based on the magnitude of the current applied to the flow rate elements, wherein said flow rate element is comprised of first and second flow rate elements, said first and second flow rate elements having diameters different from one another and, said support means supporting said first and second flow rate elements so as to be arranged concentrically with respect to the longitudinal center line of the passage.

9. An apparatus for determining the flow rate of a fluid within a passage, comprising:

a temperature sensor for detecting a temperature of the fluid flowing within the passage to provide a signal indicative thereof;

a plurality of flow rate detecting elements each including electrical resistance film for radiating heat energy to the fluid flowing within the passage;

a plurality of separate cylindrical support members having different diameters and arranged concentrically within the passage, said support members supporting said flow rate detecting elements to uniformly cover the entire stream area of a diameter section of the passage so as to maintain a difference in temperature, between the fluid detected by said temperature sensor and the heat energy radiated by the resistance film, at a constant level;

first means for determining the heat quantity transferred from said flow rate detecting elements to the fluid to provide a signal indicative thereof; and second means for determining the flow rate of the fluid flowing within the passage based on the signal output from said first means.

10. An apparatus as set forth in claim 9, wherein said flow rate elements include corrugated plate members and electrical resistance film attached thereon, each flow rate element being interposed between the concentric cylindrical support members.

11. An apparatus as set froth in claim 9, wherein said electrical resistance films are respectively disposed of areas downstream from the center of said support members with respect to the flow direction.

12. An apparatus for measuring the flow rate of a fluid within passage, comprising:

a flow rate element for radiating heat energy to fluid flowing within the passage, said flow rate element including a hollow cylindrical member and electrical resistance film attached to a preselected downstream area of the cylindrical member;

support means including a cylindrical member which is axially arranged in the flow direction for supporting said flow rate element within the passage;

first means for determining the heat quantity transferred from said flow rate element to the fluid to provide a signal indicative thereof;

second means for determining the flow rate of the fluid flowing within the passage based on the signal output from said first means; and a temperature sensor for detecting a temperature (Ta) of the fluid flowing within the passage to provide a signal indicative thereof, said flow rate element having a surface area (S) and a resistance value (Rw), said first and second means constituting a control circuit for applying a current to said flow rate element to generate heat having a temperature (Tw), said control circuit controlling the current so as to maintain a value defined by the relation (Tw−Ta) X S / Rw at a constant level based on the signal output from the temperature sensor to determine the flow rate of the fluid based on the magnitude of the current applied to the flow rate element;

wherein said electrical resistance film is disposed on areas downstream from the center of said hollow cylindrical member with respect to the flow direction.

13. An apparatus for determining the flow rate of a fluid within a passage comprising:

a plurality of flow rate elements for radiating heat energy to fluid flowing within the passage, each of said flow rate elements including a hollow cylindrical member and an electrical resistance film attached to a preselected downstream area of the cylindrical member, said cylindrical members being coaxially arranged in the flow direction and supporting said flow rate elements for radiating the heat energy to the fluid flowing through areas defined by the adjacent coaxial cylindrical members;

first means for determining a quantity of heat transferred from said flow rate elements to the fluid to provide a signal indicative thereof; and second means for determining the flow rate of the fluid flowing within the passage based on the signal output from said first means.

14. An apparatus as set forth in claim 13, wherein each of said cylindrical members disposes said flow rate elements on both surfaces contacting the flowing fluid.

* * * * *